United States Patent [19]

Guzi, Jr. et al.

[11] 4,127,422

[45] Nov. 28, 1978

[54] DRY, WATER-DISPERSIBLE PIGMENT COMPOSITIONS

[75] Inventors: John Guzi, Jr., Argyle; William J. Hart, Glens Falls, both of N.Y.

[73] Assignee: Hercules Incorporated, Wilmington, Del.

[21] Appl. No.: 800,254

[22] Filed: May 25, 1977

Related U.S. Application Data

[63] Continuation-in-part of Ser. No. 572,599, Apr. 28, 1975, abandoned, which is a continuation-in-part of Ser. No. 435,392, Jan. 21, 1974, abandoned.

[51] Int. Cl.$^2$ .............................................. C04B 31/40
[52] U.S. Cl. ........................... 106/308 Q; 106/308 M; 106/309; 260/42.51; 260/42.55; 260/42.56; 260/42.57; 260/29.6 RW; 260/17.4 ST
[58] Field of Search ........... 106/308 Q, 308 B, 308 C, 106/308 P, 308 M, 309; 260/42.51, 42.55, 42.56, 42.57, 29.6 RW, 17.4 ST, 572, 599

[56] References Cited

U.S. PATENT DOCUMENTS

| | | | |
|---|---|---|---|
| 2,907,670 | 10/1959 | Katz et al. ...................... | 106/308 Q |
| 3,067,053 | 12/1962 | Tarantino ....................... | 106/308 Q |
| 3,088,837 | 5/1963 | Prescott et al. ................. | 106/309 |
| 3,092,600 | 6/1963 | Ozawa et al. ................... | 260/42.52 |
| 3,104,068 | 9/1963 | Castelli et al. .................. | 106/309 |
| 3,652,313 | 3/1972 | Nagata et al. ................. | 260/42.52 X |
| 3,904,562 | 9/1975 | Hopfenberg et al. ........... | 106/308 M |
| 3,905,937 | 9/1975 | Khanna ........................... | 106/308 M |

*Primary Examiner*—R. Dean
*Assistant Examiner*—John P. Sheehan
*Attorney, Agent, or Firm*—Hazel L. Deming

[57] ABSTRACT

Dry pigment compositions which are easily dispersed in aqueous systems are described. The compositions contain 55 to 80% of a pigment and 45 to 20% of a nonionic material comprising, by weight of the pigment, 15 to 45% of a nonionic dispersing agent and 10 to about 67% of a water-dispersible, at least partially hydrolyzed polymer of vinyl acetate or a polymer of an N-vinyl pyrrolidone.

11 Claims, No Drawings

DRY, WATER-DISPERSIBLE PIGMENT COMPOSITIONS

This application is a continuation-in-part of U.S. patent application Ser. No. 572,599, filed Apr. 28, 1975, and now abandoned, which is in turn a continuation-in-part of U.S. patent application Ser. No. 435,392, filed Jan. 21, 1974, and now abandoned.

This invention relates to dry pigment compositions in water-dispersible form and more particularly to the production of dry pigment compositions which are easily dispersed in aqueous systems by hand mixing, which exhibit good flocculation resistance, and which develop upon dispersion in aqueous systems substantially the same strength and color values as commercial aqueous pigment dispersions.

In the past various methods have been proposed to overcome the difficulties of uniformly incorporating pigments in latex emulsion paints. For example, in U.S. Pat. No. 3,067,053 to Tarantino there is described a method for coating pigment particles in presscake form with a nonionic surface-active agent (with or without an anionic surface-active agent) to improve the ease of dispersion and produce colorants of outstanding strength and color value. Slurries or pastes of these colorants are easily dispersed in latex systems by a simple mixing or stirring operation and do not need to be milled to develop stable color values. However, when such slurries or pastes are dried and powdered, ease of dispersibility, rate of color development and strength are considerably reduced over their non-dried counterparts.

Tarantino in U.S. Pat. No. 3,067,053 also suggests using certain thickeners in amounts from about 0.8 to about 6% by weight of the dry pigment to control the viscosity of the pastes or slurries. Such thickeners are said to have no effect on the final tinctorial intensity of the pigment composition but, if a dry product is to be obtained, the thickener should be limited to pigmentary or cellulosic materials which are easily wettable, or dispersible after drying. The use of any colloid-type thickener in an amount greater than 7% is not taught by Tarantino.

Nagata et al. in U.S. Pat. No. 3,652,313 teach improving the dispersibility of pigments in latex paints by mixing the pigment with greater than 5% and preferably from 10 to 30% by weight of the pigment of a water-soluble hydroxyalkyl cellulose or a partially saponified poly(vinyl acetate) or its partially etherified derivative, and disclose that the pigment dispersions also show good redispersibility after drying. Nagata et al.'s dried dispersions, however, do not develop the full color value of the pigment and are not flocculation resistant. Dry pigment compositions which are easily dispersed in aqueous systems and which provide good strength and color qualities are not produced according to the Nagata et al. patent.

Now in accordance with the present invention it has been found that dry, water-dispersible compositions having broad compatibility in latex and other aqueous systems, such as paper coating compositions, disposable nonwovens, melamine-formaldehyde laminates, ink systems and universal colorant systems, can be produced and that such dry compositions exhibit good flocculation resistance and develop substantially the same strength and color value as commercial aqueous pigment dispersions. Further, it has been found that many of the dry, water-dispersible compositions of the present invention, at the optimum concentration for the pigment, develop upon stirring in aqueous systems strength and color values which, on an equal pigment basis, are greater than the values obtainable by milling the pigment counterpart (100% toner) in the same system, and that still certain others of these, at the optimum pigment concentration, develop strength and color values which are substantially equal to their non-dried aqueous counterparts. It is of course understood and appreciated that all pigments do not behave in the same manner in a given system and that for each pigment there will be an optimum concentration. Within the scope of the present invention it has been found that compositions containing high concentrations of pigment can be produced in a dry, water-dispersible form which provides on stirring in aqueous systems strength and color values heretofore not known to be achievable with dry compositions at similar pigment concentrations. The phrases "substantially the same as" and "substantially equivalent to," as used throughout this specification to denote strength and/or color value of pigments, are intended to mean a strength or color value which varies from the comparison by not more than about 5%.

Accordingly, the present invention relates to a process for preparing a dry water-dispersible pigment composition having the above properties, said process comprising the steps of: forming a homogeneous mixture comprising milled or homogenized pigment, water and, by weight of the pigment, (a) from 15 to 45% of a nonionic dispersing agent of the polyether alcohol type, the alkylene oxide-alkylene diamine block polymer type or the polyoxyethylene glycol or glycerol ester type, (b) from 10 to about 67% of at least one water-dispersible nonionic polymer selected from the group consisting of (1) an at least partially hydrolyzed polymer of vinyl acetate and (2) a polymer of an N-vinyl pyrrolidone and (c) from 0 to about 40% of a nonionic colloid; and removing the water from said mixture until a dry composition is obtained, the total amount of dispersing agent, polymer and colloid being from 20 to 45% by weight of the dry composition. The present invention also relates to the pigment compositions so produced.

The compositions of the invention are dry pigment concentrates comprising from 55 to 80% of pigment and from 45 to 20% of a nonionic material comprising, based on the weight of the pigment, from 15 to 45% of a nonionic dispersing agent of the polyether alcohol type, the alkylene oxide-alkylene diamine block polymer type or polyoxyethylene glycol or glycerol ester type, from 10 to about 67% of at least one water-dispersible nonionic polymer selected from the group consisting of (1) an at least partially hydrolyzed polymer of vinyl acetate and (2) a polymer of an N-vinyl pyrrolidone, and from 0 to 40% of a nonionic colloid. Preferably the compositions are concentrates containing 60–75% and most preferably 60–70% pigment.

The invention can be practiced with the inorganic and organic prime pigments, extender pigments, metallic pigments, the various finely-divided channel and furnace blacks and the like. Typical pigments include organic pigments such as diarylide yellow, the phthalocyanine blues and greens, the quinacridone reds and violets, dioxazine violet and the like; and inorganic pigments such as the cadmium reds and yellows, the cadmium sulfide type pigments, the molybdate oranges, iron oxide yellow and red, and the like. Also suitable are the hydrophilic type pigments such as, for example, titanium dioxide and the lead chromate colors.

As stated above, the use of a certain type of nonionic dispersing agent in an amount ranging from 15 to 45% by weight of the pigment is necessary to the practice of this invention. The dispersing agents which have been found to be useful in this invention are of the types known as polyether alcohols, alkylene oxide-alkylene diamine block polymers and polyoxyethylene glycol or glycerol esters and generally have an HLB greater than 11 and preferably from about 12 to about 18. Preferred nonionic dispersing agents of the polyether alcohol type are the condensates of ethylene oxide and an alcohol component such as a rosin alcohol or an alkyl phenol, condensates of propylene oxide with an alcohol component such as propylene glycol, and the like. Particularly preferred are the alkylaryl polyether alcohols which contain an average of 7 to 40 moles of ethylene oxide per mole of alcohol and contain alkyl groups of 7 to 10 carbon atoms. The polyether alcohol type dispersing agents are commercially available as the Tritons, e.g., X-100, X-102, N-101 and N-111 of Rohm and Haas Co., the Igepals of General Aniline & Film Corp., the Hyonics of Nopco Chemical Co., the Tergitols of Union Carbide Corp. and the Pluronics of BASF Wyandotte Corp. Typical of the alkylene oxide-amine block polymer type dispersing agents are the materials formed by the addition of an alkylene oxide to an alkylene diamine, as for example by the addition of propylene oxide to ethylene diamine followed by the addition of ethylene oxide. Dispersing agents of this type are commercially available as the Tetronics of BASF Wyandotte Corp. Nonionic dispersing agents of the polyoxyethylene glycol or glycerol ester type include the ethoxylated fatty and rosin acid esters such as the polyethylene glycol fatty and/or rosin acid esters and the polyoxyethylene fatty glycerides containing at least 10 moles of ethylene oxide per mole of such acids as coconut fatty acid, stearic acid, oleic acid and rosin/fatty acid combinations. Dispersing agents of this type are commercially available as the Ethofats of Armour Industrial Chemical Co. and Atlas G-1295 and G-1300 of I.C.I. America, Inc.

The amount of nonionic dispersing agent necessary will, as stated, fall within the range of 15 to 45% by weight of the pigment and sufficient dispersing agent must be present to provide ease of processing and particle size reduction. Usually, an amount between about 15 and about 35% by weight of the pigment will provide good dispersibility without detriment to any other desirable properties.

The practice of the invention also requires the presence of from 10% to about 67% by weight of the pigment of a water-dispersible nonionic polymer which is either an at least partially hydrolyzed polymer of vinyl acetate, a polymer of an N-vinyl pyrrolidone or mixtures thereof. The function of the polymer is multiphase since it acts synergistically with the dispersing agent to reduce the pigment particle size beyond that which can be accomplished by the dispersing agent alone, acts as a coating for the pigment particles to prevent reagglomeration during the drying process, acts to prevent flocculation and provides broad compatibility in a broad variety of aqueous systems. When optimum strength and color values are desired at the preferred pigment level it is usually beneficial to maintain the weight ratio of nonionic polymer (plus colloid, if present) to dispersing agent in the composition at a level greater than 0.85.

The at least partially hydrolyzed polymers of vinyl acetate which can be employed in the present invention are the completely water-dispersible and preferably the water-soluble products obtained by partial to complete hydrolysis of poly(vinyl acetate). While all molecular weights and degrees of hydrolysis are useful, the higher molecular weight grades disperse more slowly and the more highly hydrolyzed grades such as the fully hydrolyzed grades of poly(vinyl alcohol) reduce somewhat the water sensitivity of the pigment concentrates. The preferred hydrolyzed polymers of vinyl acetate which meet the above requirements and are useful in the practice of the invention include the water-soluble polymers which are at least 70% hydrolyzed, and preferably about 80 to 90% hydrolyzed, and which have a molecular weight within the range of about 2000 to about 130,000, and preferably from about 2000 to about 95,000. Such polymers are available commercially as the Gelvatols (Monsanto Company), the Elvanols (E. I. du Pont de Nemours and Company), the Lemols (Borden Chemical Company), and the Vinols (Airco Corp.). Also useful are the water-soluble ether derivatives of the partially hydrolyzed poly(vinyl acetate)s or the poly(vinyl alcohol)s wherein a portion and preferably at least 10% of the hydroxyl groups are reacted with an alkylene oxide such as ethylene oxide.

The polymers of an N-vinyl pyrrolidone which are useful in the practice of the invention are the water-dispersible nonionic polymers. Particularly useful are polymers containing from 35 to 100 mole % of units of the formula:

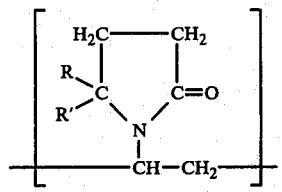

wherein R and R' are hydrogen, methyl or ethyl and from 0 to 65 mole % units of one or more monoethylenically unsaturated comonomers which will yield with the N-vinyl pyrrolidone nonionic copolymers having water-dispersibility. Thus the preferred N-vinyl pyrrolidones include N-vinyl pyrrolidone, N-vinyl-5-methyl pyrrolidone, N-vinyl-5-ethyl pyrrolidone, N-vinyl-5,5-dimethyl pyrrolidone, N-vinyl-5,5-diethyl pyrrolidone and N-vinyl-5-methyl-5-ethyl pyrrolidone.

Typical comonomers which can be polymerized with the N-vinyl pyrrolidones include vinyl esters such as vinyl acetate, acrylic acid esters such as ethyl acrylate, methacrylic acid esters such as methyl methacrylate, vinyl alkyl ethers such as vinylcyclohexyl ether, vinyl halides such as vinyl chloride, allyl alcohol, acrylonitrile, vinyl carbazole, styrene and the like.

The most preferred polymers of N-vinyl pyrrolidones are the homopolymers of N-vinyl pyrrolidone and its copolymers with vinyl esters having K-values from about 10 to 140 and preferably from about 10 to 60. Relative viscosity measurements which are designated as K-values are described in Modern Plastics, 23, No. 3, pages 157-161, 212, 214, 216 and 218 (1945). The polymers are readily obtained by conventional polymerization procedures and are available commercially as the Plasdones, Polyclars and PVPs (General Aniline and Film Corp.).

Other nonionic materials can also be present providing they do not detract from the advantages of the invention. Particularly useful are the nonionic materials known as protective colloids. They can be present in amounts up to about 40% by weight of the pigment but usually will only be employed at low pigment concentrations. If present, the colloid will preferably comprise from about 5 to about 35% and most preferably from about 10 to about 30% by weight of the pigment. Useful colloids include the nonionic cellulose ethers, starches and starch derivatives, the natural gums, poly(alkylene oxides), poly(alkylene glycols), polyacrylamide, and the like. Particularly preferred colloids are methyl cellulose, hydroxyethyl cellulose, hydroxypropyl cellulose, starch, pregelatinized starch, dextrin, hydroxypropyl starch, tapioca flour, wheat starch, casein, egg albumin, blood albumin, gelatin, bone glue, gum arabic, gum tragacanth, locust bean gum, polyacrylamide, poly(ethylene oxide) and poly(ethylene glycol).

Other nonionic materials such as wetting agents, antifoaming agents, etc., can be included in amounts up to about 3% by weight of the pigment, if desired.

As stated, the process of the invention comprises, in brief, the steps of forming a specific homogeneous mixture, and drying the mixture. The first step can be carried out in one or more stages. If one stage is used, all of the ingredients, i.e., the pigment, dispersing agent, polymer, colloid, if present, and water are milled or homogenized conventionally as, for example, in a pebble mill or a Gaulin homogenizer until a homogeneous mixture is formed. If two stages are employed, and such is generally preferred from the standpoint of economics, an aqueous dispersion of the pigment is first produced by milling or homogenizing the pigment in water in the presence of the nonionic dispersing agent, the pigment preferably being in presscake form and then the pigment dispersion so produced is intimately mixed in a second stage with the desired amount of the water-dispersible nonionic polymer and colloid, if employed. The mixing of the second stage can be carried out in any known manner for mixing solids and liquids and is suitably carried out by stirring and then homogenizing. The final step of the process is dehydration wherein the water is removed until a dry composition is obtained. Preferably the water is removed by spray drying which gives a finely-divided, dustless product directly. Alternatively, the water can be removed by tray drying and the dried product cryogenically ground to produce a product in powdery form.

The invention is further illustrated by the following examples wherein all parts and percentages are by weight unless otherwise indicated.

EXAMPLE 1

184 Parts of a copper phthalocyanine green presscake containing 68 parts of pigment (dry weight), 13.6 parts of isooctyl phenyl polyethoxyethanol, and 90 parts of water were added to a stainless steel tank equipped with an agitator and the tank contents were stirred for 30 minutes at 25° C. until deflocculation had occurred. The deflocculated pigment was next passed once through a colloid mill and homogenizer, following which the aqueous dispersion so produced was agitated for 30 minutes with 0.3 part of an antifoaming agent and 18.4 parts of a hydrolyzed poly(vinyl acetate) having an average molecular weight of 10,000 and residual poly(vinyl acetate) content of 19.5–21.5% and being 87.7–89% hydrolyzed. The resulting mixture was passed once through the homogenizer and the homogenized mixture was then spray dried at an inlet temperature of 305° C. and an outlet temperature of 106° C. to remove the water. A dry, non-dusting particulate concentrate containing 68% pigment was obtained.

The dispersibility characteristics of the pigmentary product of this example were evaluated by hand mixing 1 part of the spray dried pigment concentrate with 100 parts of a commercial latex paint formulation (Regal Wall Satin) containing

| | |
|---|---|
| 20.1% | Titanium dioxide |
| 14.3% | Silicates |
| 65.6% | Film-forming vehicle (vinyl acrylic aqueous emulsion) | until a uniform paint dispersion was obtained (about 5 minutes). The paint dispersion was next separated into two equal portions and one portion was stirred for an additional 3 minutes using a propeller-type power stirrer. Visual comparison of the hand-mixed and the power stirred paints for tint strength on paper stock indicated no differences in tint strengths.

Tint strength and flocculation resistance of the hand-mixed and power-stirred paints were further evaluated by comparison with three control paints prepared in the same manner as above except that an equal amount on a pigment basis of the following aqueous pigment dispersions was substituted for the spray-dried pigment concentrate.

Control 1: The aqueous dispersion of deflocculated pigment produced in the initial stage of this Example.
Control 2: The aqueous counterpart of the pigment concentrate of this example, i.e., the undried homogeneous mixture.
Control 3: The commercial aqueous dispersion Super IMPerse Green (phthalocyanine) — X-3289 — Hercules Incorporated.

Visual comparison of the hand-mixed and power-stirred paints on paper stock indicated that the tint strengths of all of the samples were substantially the same and that in no case was there any evidence of flocculation. When the dried forms of control 1 and control 3 were substituted for their aqueous forms, dispersibility was poor (hand-mixing versus power-stirring), tint strength and color values of the power-stirred samples were much poorer than the values achieved using the aqueous forms of controls 1 and 3, and in both cases flocculation resistance was poor.

Repetitions of the above evaluations using commercial latex paint formulations containing as the respective film-forming vehicles aqueous emulsions of a styrene-butadiene copolymer, an acrylic polymer, poly(vinyl acetate) or an acrylic-alkyd gave identical results, indicating that the dry pigmentary product of this example was readily dispersible in aqueous mediums and developed substantially the same strength and color values (on an equal pigment basis) as the aqueous dispersion, its aqueous counterpart and the commercial aqueous pigment dispersion.

EXAMPLE 2

The procedure of Example 1 was repeated except that 229 parts of Hansa yellow RX presscake containing 66 parts of pigment (dry basis) was substituted for the 184 parts of copper phthalocyanine green presscake and 13.1 parts of isooctyl phenyl polyethoxyethanol, 0.3 part of antifoaming agent, 20.9 parts of the hydrolyzed poly(vinyl acetate) and 60 parts of water were used. The resulting product was a dry, redispersible concentrate containing 66% pigment in the form of nondusting particles. When the product was evaluated in Regal Wall Satin according to the procedure of Example 1, its color strength and compatibility values were substantially equivalent at equal pigment level to the values obtained using as controls its aqueous counterpart and the commercial aqueous pigment dispersion Super IMPerse Yellow RX (X-3024 — Hercules Incorporated).

EXAMPLE 3

217 Parts of a copper phthalocyanine blue presscake containing 60 parts of pigment (dry basis) and 20 parts of isooctyl phenyl polyethoxyethanol were added to a stainless steel tank equipped with an agitator and the tank contents were stirred for 30 minutes at 25° C. until deflocculation had occurred. The deflocculated pigment was next passed once through a colloid mill and a homogenizer, following which the aqueous dispersion so produced was agitated for 30 minutes with 1.2 parts of a commercial nonionic wetting agent (alkylaryl polyether) and 180 parts of a 5% aqueous solution of the hydrolyzed poly(vinyl acetate) of Example 1. Next 9.8 parts of a starch derivative (a nonionic filler-type colloid commercially available as Dextrine) were added slowly with stirring and the mixture was stirred for an additional 15 minutes after which time stirring was discontinued and the mixture was passed once through a homogenizer. The homogenized mixture was spray dried at an inlet temperature of 315° C. and an outlet temperature of 121° C. to remove the water. The resulting product was a dry redispersible concentrate containing 60% pigment in the form of nondusting particles. When the product was evaluated in Regal Wall Satin according to the procedure of Example 1, its color strength and flocculation resistance were equivalent at an equal pigment level to the values obtained using as controls the aqueous dispersion of deflocculated pigment and the commercial aqueous dispersion Super IMPerse Blue B (X-2687 — Hercules Incorporated).

The dry dispersible pigmentary product of this example was also evaluated as a colorant for paper coating compositions, disposable nonwovens, melamine formaldehyde laminates and aqueous flexographic ink vehicles and compared (at an equal pigment basis) with the same commercial aqueous dispersion used above. In all of these tests the color value and compatibility results were identical.

EXAMPLES 4 AND 5

The procedure of Example 1 was repeated except that an equivalent amount of the following pigments in presscake form were substituted for the copper phthalocyanine green.

| Example No. | Pigment |
| --- | --- |
| 4 | Toluidine red |
| 5 | Hansa GSX |

The products of these examples were evaluated in Regal Wall Satin, according to the procedure of Example 1 and gave substantially equal color strength (at an equal pigment level) when compared with their aqueous counterparts and the commercial aqueous pigment dispersions designated as Super IMPerse Red T (X-2843) and Super IMPerse Yellow GSX (X-3488) — Hercules Incorporated, respectively.

EXAMPLE 6

200 Parts of yellow iron oxide pigment, 30 parts of the polyoxyethylene fatty glyceride, Atlas G1300, 30 parts of the hydrolyzed poly(vinyl acetate) of Example 1, 1.0 part of antifoaming agent and 340 parts of water were added to a pebble mill and the charge was milled for 20 hours, after which time the pebble mill was dumped and rinsed once with water. The milled charge (also containing the rinse water) was then air dried at 60° C. for 30 hours. The dried product was mixed with dry ice in the weight ratio of about 10/1 and the mixture was micropulverized through a 1/16 inch screen. The resulting product was a dry, redispersible concentrate containing 77% pigment in the form of non-dusting granules. When the product was evaluated in Regal Wall Satin according to the procedure of Example 1, its color strength and flocculation resistance were equivalent (on an equal pigment basis) to the commercial aqueous pigment dispersion Super IMPerse Yellow Oxide (X-3265 — Hercules Incorporated).

EXAMPLE 7

186 Parts of copper phthalocyanine green presscake containing 68 parts of pigment (dry basis), 13.6 parts of isooctyl phenyl polyethoxyethanol and 95.4 parts of water were added to a stainless steel tank equipped with an agitator and the tank contents were stirred for 30 minutes at 25° C. until deflocculation had occurred. The deflocculated pigment was passed once through a homogenizer, following which the aqueous dispersion so produced was agitated for 30 minutes with 0.3 part of an antifoaming agent and 18.4 parts of poly(N-vinyl pyrrolidone) having an average molecular weight of about 10,000 and a K-value of 15-21. The mixture was passed once through a homogenizer and the resulting homogenized mixture was air dried for 30 hours at 60° C. The dried product was mixed with dry ice in the weight ratio of about 10/1 and the mixture was micropulverized through a 1/16 inch screen. The resulting product was a dry redispersible concentrate containing 68% pigment in the form of nondusting particles. When the product was evaluated in Regal Wall Satin according to the procedure of Example 1, its color value and compatibility were substantially equivalent (at equal pigment level) to its aqueous counterpart and to the commercial aqueous pigment dispersion used in Example 1.

EXAMPLE 8

The procedure of Example 7 was repeated except that 150 parts (55 parts, dry basis) of copper phthalocyanine green presscake, 8.25 parts of isooctylphenyl polyethoxyethanol, 118.6 parts of water and 0.2 part of antifoaming agent were used and 36.75 parts of the hydrolyzed poly(vinyl acetate) of Example 1 was substituted for the 18.4 parts of poly(N-vinyl-pyrrolidone). The resulting product was a dry, redispersible concentrate containing 55% pigment in the form of nondusting particles. When the product was evaluated in Regal Wall Satin according to the procedure of Example 1, its color value and compatibility were substantially equivalent (at equal pigment level) to its aqueous counterpart and to the commercial aqueous pigment dispersion used in Example 1.

EXAMPLE 9

The procedure of Example 6 was repeated except that 27 parts of poly(N-vinyl pyrrolidone) having an average molecular weight of about 10,000 and a K-value of 15-21 was substituted for the 30 parts of hydrolyzed poly(vinyl acetate). The resulting product was a dry, redispersible concentrate containing 78% pigment in the form of soft, non-dusting granules. When the concentrate was evaluated in Regal Wall Satin according to the procedure of Example 1, its color strength, flocculation resistance and compatibility were equivalent (at the same pigment level) to the commercial aqueous pigment dispersion used in Example 6.

EXAMPLE 10

198 Parts of copper phthalocyanine green presscake containing 64.5 parts of pigment (dry basis), 16.15 parts of isooctyl phenyl polyethoxyethanol and 70 parts of water were added to a stainless steel tank equipped with an agitator and the tank contents were stirred for 30 minutes at 25° C. until deflocculation had occurred. The deflocculated pigment was passed twice through a homogenizer, following which the aqueous dispersion so produced was agitated for 30 minutes with 0.3 part of an anti-foaming agent, 12.9 parts of isooctyl phenyl polyethoxyethanol and 6.45 parts of the hydrolyzed poly(vinyl acetate) of Example 1. The mixture was passed twice through a homogenizer and the resulting homogenized mixture was air dried for 30 hours at 60° C. The dried product was mixed with dry ice in the weight ratio of about 10/1 and the mixture was micropulverized through a 1/16 inch screen. The resulting product was a dry redispersible concentrate containing 64.5% pigment in the form of non-dusting particles. When the product was evaluated in Regal Wall Satin according to the procedure of Example 1, its color strength, flocculation resistance and compatibility were substantially equivalent (at equal pigment level) to its aqueous counterpart.

EXAMPLE 11

The procedure of Example 10 was repeated except that 6.45 parts of the poly(N-vinyl pyrrolidone) of Example 7 were substituted for the hydrolyzed poly(vinyl acetate). The resulting product was a dry, redispersible concentrate containing 64.5% pigment in the form of non-dusting particles. When the product was evaluated in Regal Wall Satin according to the procedure of Example 1, its color strength, flocculation resistance and compatibility were substantially equivalent (at equal pigment level) to its aqueous counterpart and to the commercial aqueous pigment dispersion used in Example 1.

What we claim and desire to protect by Letters Patent is:

1. A process for preparing a dry, water-dispersible pigment composition comprising the steps of: forming a homogeneous mixture comprising milled or homogenized pigment, water and, by weight of the pigment, (a) from 15 to 45% of a nonionic dispersing agent selected from the group consisting of polyether alcohols, alkylene oxide-alkylene diamine block copolymers, polyoxyethylene glycol esters and polyoxyethylene glycerol esters, (b) from 10 to about 67% of at least one water-dispersible nonionic polymer selected from the group consisting of (1) an at least partially hydrolyzed polymer of vinyl acetate and (2) a polymer of an N-vinyl pyrrolidone and (c) from 0 to 40% of a nonionic colloid; and removing the water from said mixture until a dry composition is obtained, the total amount of dispersing agent, polymer and colloid being from 20 to 45% by weight of the dry composition.

2. A process for preparing a dry, water-dispersible pigment composition comprising the steps of:
   (a) milling or homogenizing pigment in water in the presence of from 15 to 45% by weight of the pigment of a nonionic dispersing agent selected from the group consisting of polyether alcohols, alkylene oxide-alkylene diamine block polymers, polyoxyethylene glycol esters and polyoxyethylene glycerol esters to form an aqueous pigment dispersion;
   (b) mixing said pigment dispersion with from 10 to about 67% by weight of the pigment of at least one water-dispersible nonionic polymer selected from the group consisting of (1) an at least partially hydrolyzed polymer of vinyl acetate and (2) a polymer of an N-vinyl pyrrolidone, and from 0 to about 40% by weight of the pigment of a nonionic colloid until a homogeneous mixture is formed; and
   (c) removing the water from said mixture until a dry composition is obtained, the total amount of dispersing agent, polymer and colloid being from 20 to 45% by weight of the dry composition.

3. The process of claim 2 wherein the water is removed in step (c) by spray drying the mixture.

4. The process of claim 2 wherein the polymer is about 80 to about 90% hydrolyzed poly(vinyl acetate).

5. The process of claim 2 wherein the polymer is poly(N-vinyl pyrrolidone).

6. A dry, water-dispersible pigment composition exhibiting good flocculation resistance and developing upon dispersion in aqueous systems good strength and color values, said composition comprising from 55 to 80% of pigment and from 45 to 20% of a nonionic material comprising, based on the weight of the pigment, from 15 to 45% of a nonionic dispersing agent selected from the group consisting of polyether alcohols, alkylene oxide-alkylene diamine block polymers, polyoxyethylene glycol esters and polyoxyethylene glycerol esters, from 10 to about 67% of at least one water-dispersible nonionic polymer selected from the group consisting of (1) an at least partially hydrolyzed polymer of vinyl acetate and (2) a polymer of an N-vinyl pyrrolidone, and from 0 to 40% of a nonionic colloid.

7. The composition of claim 6 wherein the polymer is about 80 to about 90% hydrolyzed poly(vinyl acetate).

8. The composition of claim 6 wherein the polymer is poly(N-vinyl pyrrolidone).

9. The composition of claim 7 wherein the dispersing agent is a polyether alcohol.

10. The composition of claim 9 wherein the colloid is a starch derivative which is present in an amount ranging from about 5 to about 35% by weight of the pigment.

11. The composition of claim 9 wherein the pigment is present in an amount ranging from 60 to 75% by weight of the composition and the weight ratio of nonionic polymer plus nonionic colloid to dispersing agent is greater than 0.85.

* * * * *